H. D. FLEGEL.
SERVING FORK.
APPLICATION FILED JAN. 9, 1918.
1,272,246.
Patented July 9, 1918.
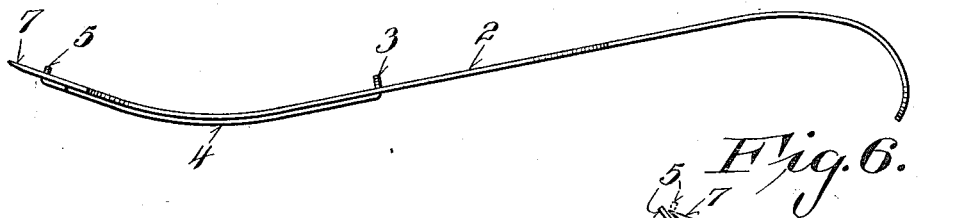
Fig. 1.
Fig. 6.
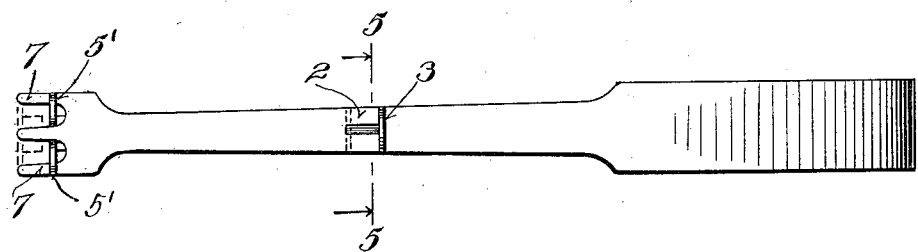
Fig. 2.
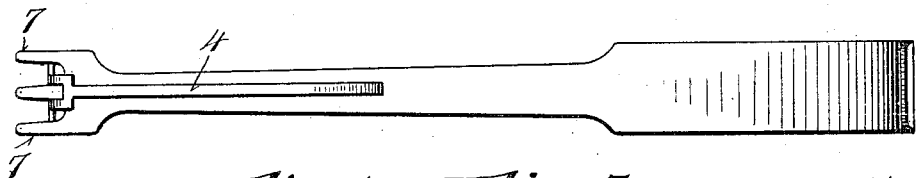
Fig. 3.
Fig. 4. Fig. 5.
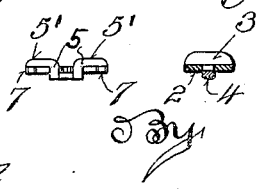
Inventor
Harrison D. Flegel
Geo. W. Young
By
Attorney
Witness
T. P. Britt

UNITED STATES PATENT OFFICE.

HARRISON D. FLEGEL, OF RACINE, WISCONSIN.

SERVING-FORK.

1,272,246.

Specification of Letters Patent.

Patented July 9, 1918.

Application filed January 9, 1918. Serial No. 210,961.

*To all whom it may concern:*

Be it known that I, HARRISON D. FLEGEL, a citizen of the United States, and resident of Racine, in the county of Racine and State of Wisconsin, have invented certain new and useful Improvements in Serving-Forks; and I do hereby declare that the following is a full, clear, and exact description thereof.

This invention relates to serving forks and has for its object to provide a simple and economical attachment for stripping articles from the prongs of the fork.

This invention in one practical form in which it may be embodied is illustrated in the accompanying drawing, in which:

Figure 1 is an elevational view of a serving fork with my stripping device attached thereto.

Fig. 2 is a top plan view of the same.

Fig. 3 is a bottom plan view of the same.

Fig. 4 is an end view of a fork showing the manner in which the stripper straddles the prongs.

Fig. 5 is a sectional view through the handle of the fork taken on the line 5—5 of Fig. 2, and Fig. 6 is an enlarged detail view showing a fragment of the fork and stripper to clearly illustrate the manner in which the stripper is attached to the fork.

In the drawings I have shown my stripper attached to a fork having comparatively short prongs and which is especially adapted for pickles and similar articles. The handle of the fork is bent in a slight curve sufficient to enable it to be hung on the side of the jar or container. Centrally of the fork handle 1 is a longitudinally disposed slot 2 which permits an operating nib 3 of the stripper attachment 4 to be operated back and forth. The opposite end of the stripper 4 is provided with a pair of spaced arms 5 which extend upwardly between the interstices of the fork prongs 7, the said arms terminating with transversely arranged guide webs 5' which are adapted to ride upon the outer fork tangs.

In operation after an article has been picked up upon the prongs of the fork it is only necessary for the operator to push the nib 3 forward thereby forcing the arms 5 forward stripping the articles from the prongs.

In assembling the stripper attachment upon the fork the nib 3 is first inserted into the slot 2 when the stripper is positioned at approximately a right-angle to the fork handle, after which the stripper is swung around to lie parallel therewith. This will bring the arms 5 to a position adjacent the extreme ends of the prongs and in alinement with the interstices thereof as shown in Fig. 6, after which they are bent over the extreme ends of the prongs. The webs 5' of the arms thus form guides for the outer end of the stripper and at the same time when they are bent in position they secure this end of said stripper permanently to the fork.

Thus it will be seen that the stripper is primarily stamped from a single flat blank and is assembled without the use of rivets or other fastening devices and all close joints are dispensed with, which joints would serve as crevices for unsanitary deposits.

It will be seen from the above description that a very cheap and efficient stripper attachment has been provided which is simple to operate. While I have shown my device attached to one form of serving fork it will be readily appreciated that the same can be used in connection with any style fork for any purpose and various ways may be devised for constructing the same and attaching it to the fork without departing from the spirit of my invention.

What is claimed is:

In a table fork having a handle provided with a longitudinally disposed slot; the combination of a stripper slidably mounted upon the handle, the same comprising a flat metallic blank provided with an upturned transversely disposed key-shaped nib which is adapted to be inserted through the slot of the handle in assemblage when the stripper is positioned at approximately a right angle to said handle, a pair of spaced arms extending from the opposite end of the stripper, the same terminating with transversely arranged guide webs, which webs are adapted to be bent upwardly for sliding engagement with one face of certain of the fork tangs, when the scraper is swung to its alined position with the fork handle, in which position the webbed arms have play in the fork interstices.

In testimony that I claim the foregoing I have hereunto set my hand at Milwaukee, in the county of Milwaukee and State of Wisconsin.

HARRISON D. FLEGEL.

Copies of this patent may be obtained for five cents each, by addressing the "Commissioner of Patents, Washington, D. C."